Patented Jan. 13, 1931

1,788,585

UNITED STATES PATENT OFFICE

ADOLPHE H. NEY, OF PASSAIC, NEW JERSEY, ASSIGNOR TO THE GOODYEAR TIRE & RUBBER COMPANY, OF AKRON, OHIO, A CORPORATION OF OHIO

PROCESS FOR MANUFACTURING SUBSTITUTED MERCAPTO-BENZO-THIAZOLES

No Drawing.  Application filed January 9, 1928.  Serial No. 245,632.

This invention relates to a new and improved method of producing substituted mercapto-aryl-thiazoles, and it has particular relation to methods of preparing substituted mercapto-aryl-thiazoles from arylene thiazthionium chlorides.

One object of the invention is to provide a simple and economical method of manufacturing the above mentioned thiazoles, which involves the use of substantially atmospheric temperatures and pressures.

Another object of the invention is to provide a new class of substituted mercaptobenzothiazoles.

Recently, mercaptothiazoles have attained much commercial importance because of the discovery of their value as accelerators in the vulcanization of rubber, and as promoters in the process of concentrating low grade ores by froth flotation.

Mercaptobenzothiazole and some of its substitution products and homologues have been produced by a number of reactions. One method comprises treating thiocarbanilid, or salts of dithiocarbamic acid with sulphur. Another process consists in subjecting a mixture of an arylamine, sulphur and carbondisulphide to heat and pressure in an autoclave. The first mentioned method can hardly be considered of commercial value because of the relatively low yields obtained and because of the difficulty of purifying the product. Although yields of 95% of the theoretical maximum amount are claimed to be obtainable under certain conditions by the employment of the last mentioned process, its use entails the employment of relatively high pressures (450 lbs. per sq. in.) and temperatures (250° to 300° C.) which, in view of the presence of such extremely inflammable substances as carbondisulphide and hydrogensulphide, tend to create a fire hazard unless carefully handled. Moreover, by reason of the necessarily limited size of high pressure autoclaves, the batches produced are comparatively small.

This invention consists in the provision of a novel process of manufacturing certain substituted mercaptobenzothiazoles whereby exceptionally high yields of substantially pure product are obtained without the use of high temperatures or pressures.

In this process arylene thiazthionium chlorides, first described in British Patents Nos. 17,417 and 18,292, both of 1914, in form of labile heterocyclic nuclei of the formula

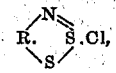

in which R is an aryl group, are employed as basic materials. By subjecting the aryl thiazthionium chlorides successively to the action of water, alkali and carbondisulphide at ordinary or slightly elevated temperature, the corresponding 1-mercaptobenzothiazole derivatives are formed with substantially quantitative yields. The reactions involved may be represented by the following equation:

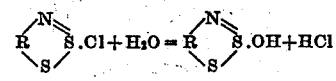

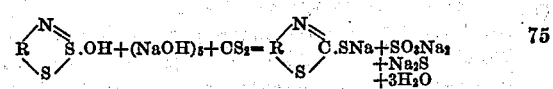

where R is an aryl group.

Arylene thiazthionium chlorides, which constitute the primary materials in this process, are preferably produced by the action of an excess of disulphurdichloride upon hydrochloride salts of arylamines or derivatives thereof having at least one position ortho to the amino group free or unsubstituted. This reaction should be effected at temperatures ranging from approximately 30° C. to approximately 80° C. Solvents may be employed if desired but they should be anhydrous and inert to the action of sulphur-chloride and hydrochloric acid. If arylamines, in which the position para to the amido group is either free or occupied by an atom or radical, readily replaceable by chlorine, are employed in the reaction, products containing chlorine substituted in the benzene ring result. One typical example of such chlorine substituted compounds, the reaction product formed by aniline, and disulphurdichloride, may be represented as follows:

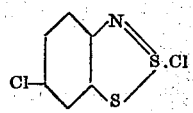

This compound is identical with the product obtained from parachloraniline.

If certain arylamines, such as p-toluidine, or derivatives thereof which contain a methyl (or an alkyl) group in the position para to the amine group, are employed, it is possible under certain conditions to obtain perfect analogs of the above-mentioned products. Arylene thiazthionium chlorides, when in a dry state, are powdery substances which vary in color from yellow to brown. These powders are insoluble in benzol, carbontetrachloride and most of the usual organic solvents, but are soluble in glacial acetic acid from which they may be regenerated, unchanged by crystallization or precipitation with a non-solvent. If the powders are dissolved in water, strongly colored solutions result; if the latter are allowed to stand for some time, hydrochloric acid is split off from the arylene thiazthionium chloride and the solutions become colorless, or nearly so, and at the same time, colorless or almost colorless precipitates are formed. The chemical formula of the precipitates probably may be represented by the following formula:

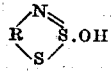

where R is an aryl group. These materials dissolve in alkalies to give clear, colorless solutions from which the original substances can no longer be regenerated.

In certain instances, the separation of the precipitate from the aqueous solution is somewhat tardy. In such cases the precipitation is accelerated by careful addition of alkalies or the salts of such weak acids as the acetate of soda.

If the alkaline solution of the product, resulting from the action of water upon the arylene thiazthionium chloride, be agitated with a quantity of carbondisulphide, slightly in excess of molecular proportions at ordinary, or only slightly elevated temperatures; most of the carbondisulphide will dissolve within an hour and a mercaptobenzothiazole derivative will form. In case the solution is still alkaline at the end of the latter step, it should be neutralized with acid in order to insure complete precipitation of the thiazole. This compound may then be removed from the solution by filtration.

The nature of resulting mercaptobenzothiazole derivative is determined by that of the amines employed as a primary material. In case aniline is used, 1-mercapto-5-chlorbenzothiazole, M. P. 253° C. (corrected) is obtained as a final product. The use of o-toluidine and p-phenethidine results in the formation of 2-mercapto-3-methyl-5-chlorbenzothiazole (melting point 252° C.) and 2-mercapto-5-ethoxy-benzothiazole respectively. Also, by the use of the proper substituted aryl amines as primary ingredients, the following mercaptobenzothiazoles have been obtained.

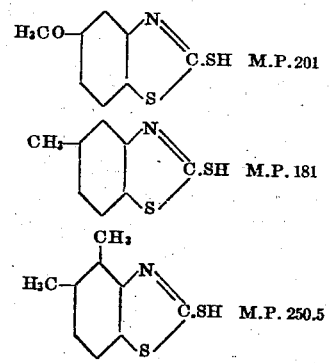

To illustrate, but not to limit the invention, the preparation of 1-mercapto-3-methyl-5-chlor-benzothiazole will be described in detail.

1000 pounds of toluene thiazthionium chloride prepared by the interaction of disulphurdichloride and ortho-toluidine hydrochloride, in accordance with the method described in British Patent 17,417 of 1914, are introduced into a vat containing 10,000 to 12,000 pounds of water at ordinary temperature. The mixture in the vat is stirred while the material is being introduced therein. The solution is then agitated until the original intensely yellow color thereof has practically disappeared and a greyish or pinkish white precipitate has formed. The latter is separated from the mother liquor by filtration and washed free from acid with water. Next the resulting paste is suspended in about 2000 to 3000 pounds of water and to this suspension sufficient caustic soda solution is added to dissolve the precipitate and to render the whole strongly and permanently alkaline. The solution is then treated with 350 to 400 pounds carbondisulphide and the whole is vigorously agitated in order to insure thorough mixture of all constituents. It is desirable, although not absolutely necessary, to add to the mixture 50 to 150 pounds of sodiumhydrosulphide in order to promote the reaction. Agitation is continued until the maximum amount of carbondisulphide has been absorbed which usually requires from one to two hours. The reaction may be accelerated by slightly warming the mixture, but in the latter case, owing to the great volatility and inflammability of the carbondisulphide, it should be conducted in a closed vessel and under a reflux condenser. Upon completion of the reaction, the mixture is filtered to remove impurities. Also, it is heated either before or after filtration, to a temperature of 70° C. to drive off excess of carbondisulphide, if any remain. Acid is then added until the solution becomes neutral, or until further addition of acid to a sample no longer causes additional precipitate to form. The voluminous white precipitate consisting of almost pure 1-mercapto-3-methyl-5-chlor-benzothiazole is removed from the solution by filtration. To remove small amounts of impurities consisting principally of 1-mercapto-3-methyl-5-chlor-benzothiazole disulphide, the precipitate may be dissolved in sodium hydroxide re-precipitated with acid and removed from the solution by a second filtration. The 1-mercapto-3-methyl-5-chlor-benzothiazole prepared by the above method after one recrystallization from acetic acid of 80% concentration, has a melting point of 252° C. (corrected) while its disulphide prepared by Hoffman's method, and crystallized from benzol, has a melting point of 178° (corrected).

It is obvious that for any technical purpose, such as use for flotation agents or rubber vulcanization accelerators, purification may be quite superfluous.

The invention is not restricted to the 1-mercapto aryl thiazole derivatives enumerated herein, because a considerable number of other substituted 1-mercaptobenzothiazoles may be prepared from the corresponding arylamines, examples of such being those formed from amines of the naphthaline, anthracene and diphenyl series. For the purposes of this invention it is immaterial in what sequence the materials employed are incorporated, or whether they are combined in any particular proportion. Furthermore, the conditions of temperature, and other physical or mechanical factors may vary within rather wide limits.

Although I have described in detail only the preferred embodiments of the invention, it will be apparent to those skilled in the art that it is not so limited but that various minor modifications may be made therein without departing from the spirit of the invention or from the scope of the appended claims.

Having thus described the object of my invention, and the manner in which it may be practiced, what I claim is:

1. A process for making substituted mercaptobenzothiazoles which comprises subjecting the reaction products of disulphur-dichloride upon an arylamine to the action of water and subjecting the resulting product to the action of an alkali and carbondisulphide, substantially as described.

2. A process for making substituted mercaptobenzothiazoles which comprises subjecting a reaction product of disulphur-dichloride upon an arylamine to the action of water, separating the resulting product, dissolving the same in an alkali, associating the alkaline solution with carbondisulphide and separating the substituted mercaptobenzothiazole, substantially as described.

3. A process of making mercaptobenzothiazoles which comprises treating a benzene thiazthionium chloride with water alkali and carbondisulphide.

4. A process of making a 5-chlor 1-mercaptobenzothiazole which comprises treating a benzene thiazthionium chloride with water and alkali, and associating the resulting alkaline solution with carbondisulphide, and separating the 1-mercaptobenzothiazole thus formed.

5. A process of making 1-mercapto-3-methyl-5-chlor-benzothiazole which comprises treating a methyl substituted benzo thiazthionium chloride with water, separating the resulting transformation product, dissolving the said transformation product in caustic alkali, associating the resulting alkaline solution with carbondisulphide, and separating the 1-mercapto-3-methyl-5-chlor-benzothiazole.

6. A process of making 1-mercapto-3-alkyl-5-chlor-benzothiazole which comprises treating the reaction product of ortho alkyl substituted aniline and disulphur dichloride formed at a temperature of approximately 70° C., with water, alkali and carbon bisulphide.

7. A method of making 1-mercapto-3-alkyl-5-chlor-benzothiazole which comprises treating an alkyl benzene thiazthionium chloride in successive steps with water, an alkali, and carbon bisulphide.

8. A process of making 1-mercapto-3-methyl-5-chlor-benzothiazole which comprises treating the reaction product of ortho toluidine and disulphur dichloride formed at a temperature of approximately 70° C., with water, alkali and carbon bisulphide.

9. A process of making 1-mercapto-3-methyl-5-chlor-benzothiazole which comprises treating methyl substituted benzene thiazthionium chloride with water, an alkali and carbon bisulphide.

10. A new chemical compound comprising 1-mercapto-3-alkyl substituted 5-chlor-benzothiazole.

11. A new chemical compound comprising 1-mercapto-3-methyl-5-chlor-benzothiazole.

In testimony whereof I affix my signature.

ADOLPHE H. NEY.